(12) United States Patent
Gerbo

(10) Patent No.: US 6,668,754 B1
(45) Date of Patent: Dec. 30, 2003

(54) NIPPLE VALVE WATERER

(75) Inventor: Michael R. Gerbo, Marshalltown, IA (US)

(73) Assignee: Ritchie Industries, Inc., Conrad, IA (US)

( * ) Notice: Subject to any disclaimer, the term of this patent is extended or adjusted under 35 U.S.C. 154(b) by 0 days.

(21) Appl. No.: 10/140,595

(22) Filed: May 7, 2002

(51) Int. Cl.[7] .................................................. A01K 7/02
(52) U.S. Cl. .......................................... 119/72.5; 119/72
(58) Field of Search .............................. 119/72.5, 75, 72, 119/51.5; 251/357, 359, 360, 366; 151/333

(56) References Cited

U.S. PATENT DOCUMENTS

| | | | | |
|---|---|---|---|---|
| 2,510,252 A | * | 6/1950 | Pine ............................ | 119/72.5 |
| 3,550,560 A | * | 12/1970 | Edstrom ...................... | 119/72.5 |
| 3,590,781 A | * | 7/1971 | Spencer ...................... | 119/72.5 |
| 3,887,165 A | * | 6/1975 | Thompson ................... | 251/339 |
| 4,187,804 A | * | 2/1980 | von Taschitzki ............ | 119/72.5 |
| 4,391,225 A | * | 7/1983 | Sparks ........................ | 119/72.5 |
| 4,403,570 A | * | 9/1983 | Freehafer ..................... | 119/72.5 |
| 4,586,464 A | * | 5/1986 | Agerley et al. ............. | 119/72.5 |
| 4,819,585 A | * | 4/1989 | Dolan et al. ................ | 119/72.5 |
| 5,003,927 A | * | 4/1991 | Thompson ................... | 119/72.5 |
| 5,373,811 A | * | 12/1994 | Wastell ........................ | 119/72.5 |
| 6,308,657 B1 | * | 10/2001 | Schumacher et al. ......... | 119/72 |
| 2003/0047702 A1 | * | 3/2003 | Gunnarsson et al. ........ | 251/297 |

* cited by examiner

Primary Examiner—Yvonne Abbott
(74) Attorney, Agent, or Firm—G. Brian Pingel; Camille L. Urban

(57) ABSTRACT

A nipple valve including a valve body with an outside surface in which are ground at least one semi-circular indentation which serves as a tool grip. The semi-circular indentation is formed in the shape of a trough with oppositely disposed open ends to permit a wrench to be placed and retained in position on the valve body during installation or removal of the valve.

15 Claims, 3 Drawing Sheets

NIPPLE VALVE WATERER

BACKGROUND OF THE INVENTION

1. Field of the Invention

The present invention relates in general to nipple valves which provide passage to liquid when pressure is applied on the valve and, more specifically, to nipple valves used in animal waterers.

2. Description of the Prior Art

It is known in the art that nipple valves can be very useful in controlling the cleanliness and amount of liquid provided. The general premise of operation relies on pressure put on the nipple portion which, in turn, opens a valve through which liquid is delivered. These kinds of valves are available in different sizes and materials, some with filters incorporated.

Often a nipple valve will include an outside portion which is threaded. This portion is then turned on to mating threads of an apparatus on which the nipple valve is to be mounted in order to dispense fluid. Especially in applications wherein a nipple valve is employed in an animal waterer, the nipple valve will need to be removed for repair or for replacement on occasion. Prior art nipple valves have facilitated removal by providing a form of tool grip.

Some tool grips are in the form of a hexagonal flange to provide multiple surfaces for gripping by a wrench. However, these flanges then become the outside circumference of the nipple valve and, therefore, require additional space in which to mount the valve.

Other tool grips have been employed wherein two wrench flats are ground into the valve body. However, these wrench flats must be ground relatively deep to provide a useful flat surface. Such depth creates weaknesses in the valve body which, even when only two wrench flats are provided, may result in cracking or breaking when torque of enough magnitude is applied. In addition, grinding to this depth becomes a hindrance to manufacturing the valves because the grinding process requires a relatively large amount of time. Finally, with only two wrench flats provided, there is only one angle at which the tool can be applied to loosen and remove the valve. Considering the variety of ways such a valve may be used, this limitation in the manner by which the valve can be removed limits the practical uses of the valve. On the other hand, additional flats are not feasible because of the inherent weaknesses which result.

One objective of the present invention is to provide a nipple valve with a tool grip that does not result in structural weakness causing breakage upon application of torque.

It is a second objective of the present invention to lessen the time required for manufacture.

It is a third objective to provide a nipple valve with a tool grip that includes multiple gripping surfaces for application of the loosening tool which results in more possible applications of the nipple valve.

It is a fourth objective to provide a nipple valve with a tool grip which does not of itself present a larger circumference than does the valve body.

SUMMARY

The present invention provides a nipple valve waterer with a tool grip which preferably provides multiple gripping surfaces. The gripping surfaces are each semi-circular in depth like an open-ended trough and located in the outer surface of the valve body. The advantages of this construction include providing multiple gripping surfaces such that a tool can be applied from more than one angle; reducing the time required for the grinding process during manufacturing; eliminating flat edges that exist on other gripping surfaces so that the open-ended trough shape acts almost as a guide when applying the loosening tool; and creating gripping surfaces of a depth that does not result in a noticeable weakness during normal installation or removal.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DESCRIPTION OF THE PREFERRED EMBODIMENT(S)

Figure 1:
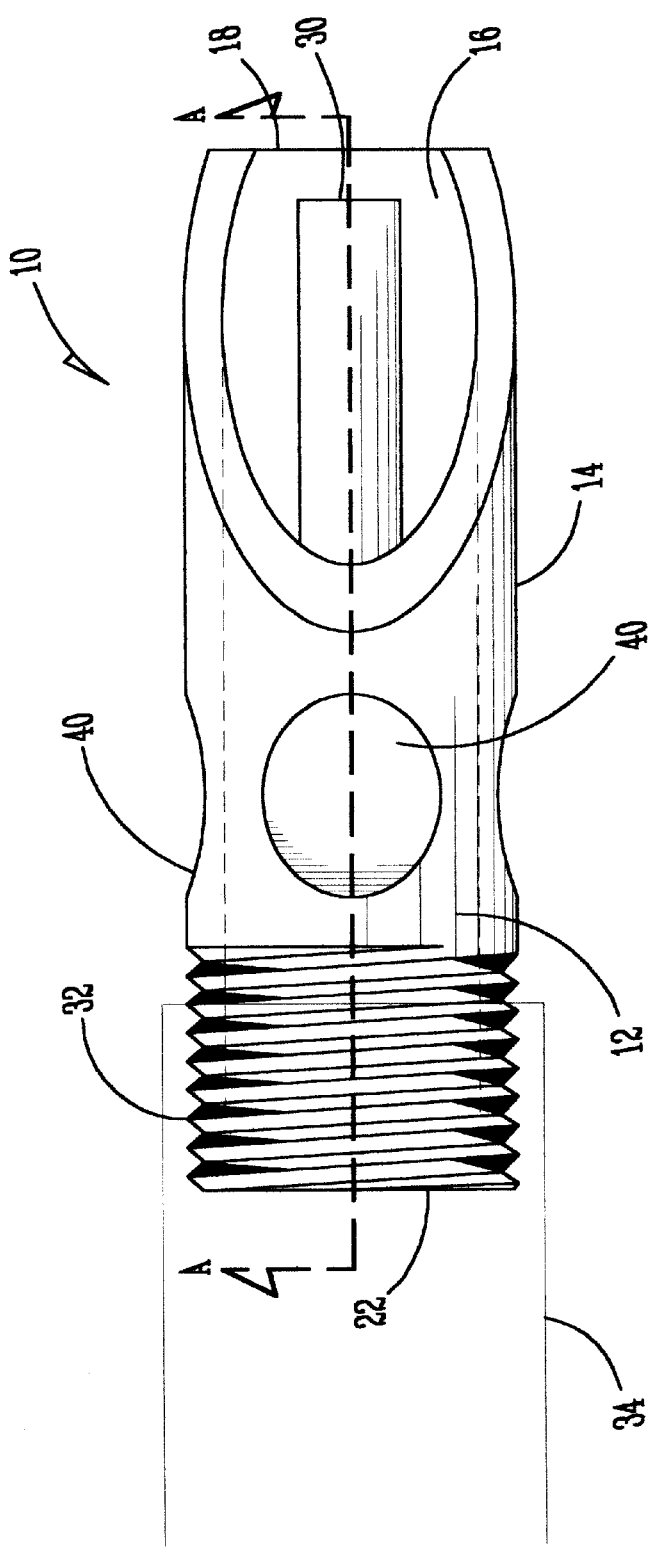
FIG. 1 is a top plan view of a nipple valve embodying the tool grip of the present invention.
Figure 2:
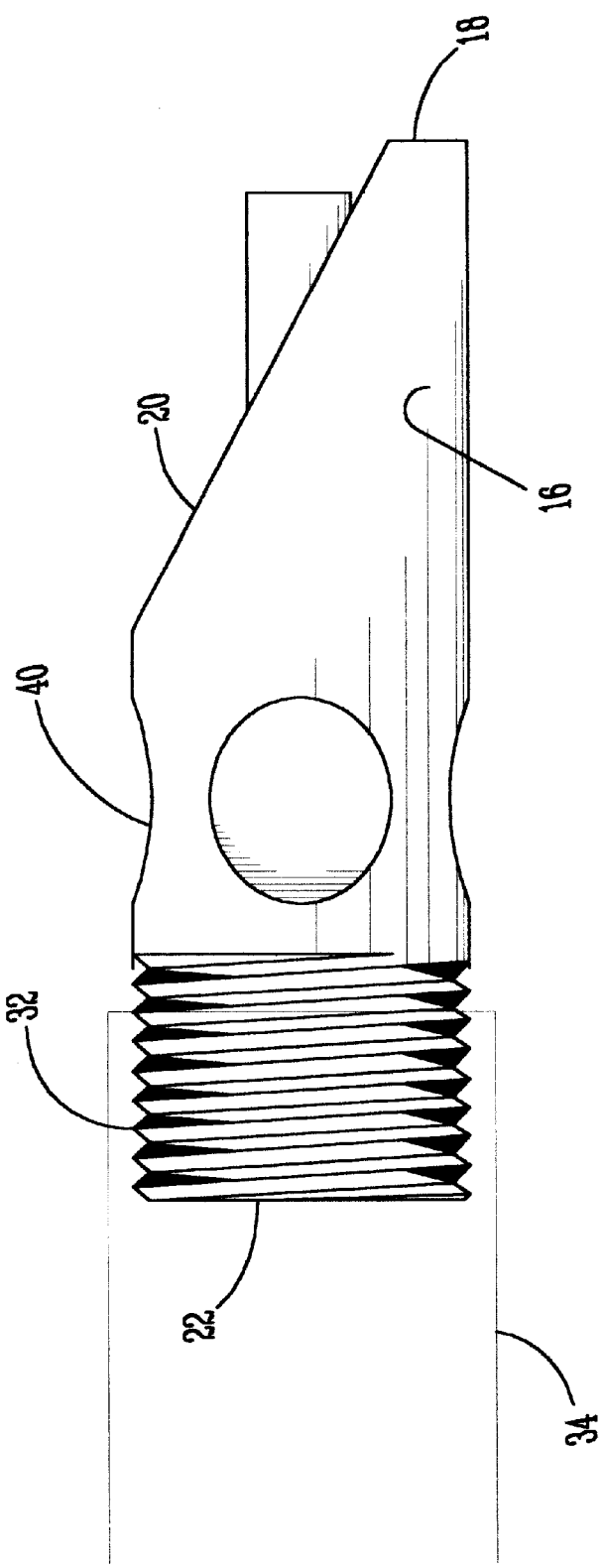
FIG. 2 is a side view of the nipple valve showing the depth and shape of the tool grip.

Referring now to the drawings and with reference first to FIG. 1, a preferred embodiment of a tool grip on a nipple valve of the present invention is shown generally at 10. The nipple valve 10 is designed primarily to allow animals to obtain clean drinking water while protecting against waste and contamination, however, there are other possible uses for nipple valves.

The nipple valve 10 is one of general construction having a valve body 12 with an outside, generally cylindrical surface 14 and an internal passageway 16 along an axis shown by line A—A parallel with and through said valve body 12. The nipple valve 10 further comprises a discharge end 18 which is cut away at a slant 20 to expose said passageway 16, and a coupling end 22. A valve member 30 is disposed within the passageway 16 and is connected to valve means for which the mechanicals are well known in the art and need not be described here.

Means 32 to sealingly connect the coupling end 22 to a water source 34 are normally formed on the valve body 12. In the preferred embodiment, the means 32 to sealingly connect the coupling end 22 to the water source 34 comprises a plurality of threads.

Figure 3:
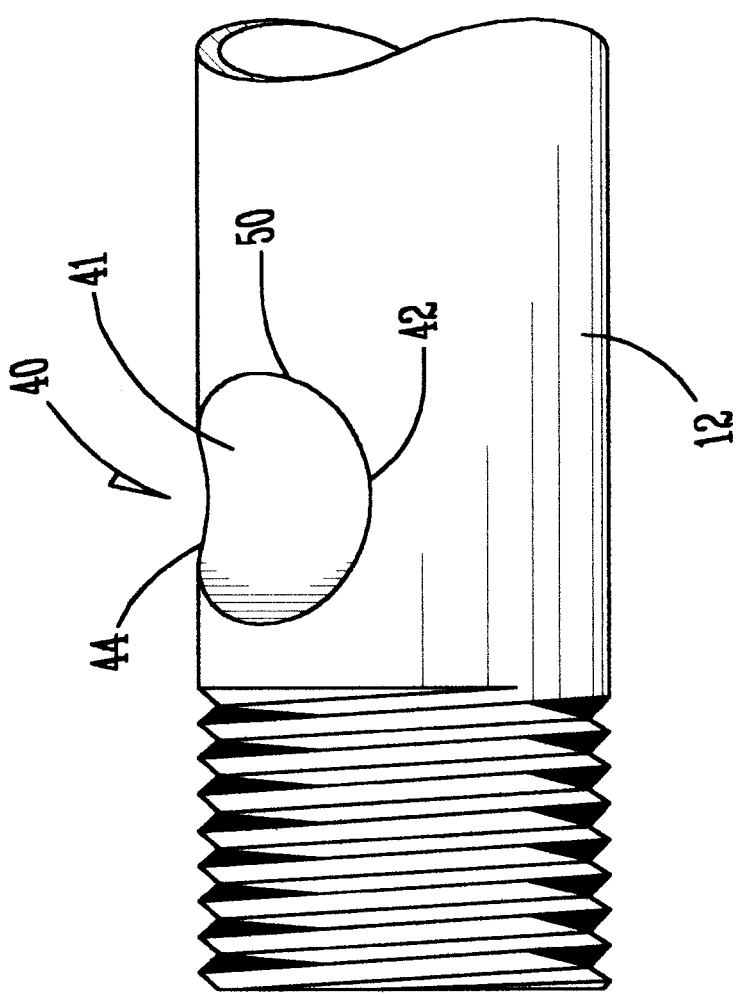
FIG. 3 is an enlarged perspective view of the tool grip of the present invention.

The valve body 12 of the present invention preferably comprises a plurality of gripping surfaces 40 on its outside surface 14. As shown best in FIG. 3, each of the gripping surfaces 40 is formed of a trough 41 comprising first and second open ends 42 and 44, respectively, in said outside surface 14 of the valve body 12. Each of the gripping surfaces 40 further comprises a circumference 50 on the valve body 12 that does not have the type of sharp edges normally associated with the use of wrench flats on the body 12 as are often used in the prior art.

In the preferred embodiment, at least two of the gripping surfaces 40 are formed preferably on opposite sides of the valve body 12 by applying a cylindrical, rotational grinder perpendicular to the axis 18 of the body 12. In this way, the troughs 41 are provided with the first and second open ends 42 and 44 in the valve body 12. The grinding of each of the gripping surfaces 40 results in the circumference 50 in the outside surface 14. Although the objectives of the present invention can be provided by forming only one gripping surface on the valve body 12, it is highly preferable for ease in installation ore removal of the valve 10 to grind four of the surfaces 40 on the body 12 evenly spaced ninety degrees apart around the outside, generally cylindrical surface 14.

When the nipple valve 10 needs to be replaced or repaired, a loosening tool 52 such as a wrench is placed on at least one of the plurality of gripping surfaces 40 and torque is applied to disconnect the valve 10 from the water source 34 or other apparatus. As the loosening tool 52 is placed on the gripping surfaces 40, the sloping sides of the trough 41 act as a guide to assist in placing and retaining the loosening tool on the body 12.

Thus, the present invention has been described in an illustrative manner. It is to be understood that the terminology that has been used is intended to be in the nature of words of description rather than of limitation.

Many modifications and variations of the present invention are possible in light of the above teachings. For example, the present invention could include only one gripping means on the outside cylindrical surface to speed and simplify manufacturing or it could include gripping means at a variety of places on the outside surface to facilitate tool placement when a valve is installed in a tighter place or at an angle. Therefore, within the scope of the appended claims, the present invention may be practiced otherwise than as specifically described.

What I claim is:

1. A nipple valve used in an animal waterer comprising:
  a) a valve body shaped cylindrically and with an outside surface;
  b) said valve body further comprising an internal passageway;
  c) a tool grip comprising at least one gripping means on said outside surface of said valve body;
  d) said gripping means comprising a trough;
  e) said valve body further comprises a discharge end and a coupling end; and
  f) said trough comprises a first open end and a second open end, is oriented perpendicular to said internal passageway, and has rounded, sloping sides.

2. A nipple valve as claimed in claim 1 wherein said number of gripping means is at least 2.

3. A nipple valve as claimed in claim 2 wherein said coupling end comprises means to sealingly connect said coupling end to a water source.

4. A nipple valve as claimed in claim 3 wherein said means to sealingly connect said coupling end to said water source comprises a plurality of threads.

5. A nipple valve used in an animal waterer comprising:
  a) a valve body;
  b) said valve body comprising and outside generally cylindrical surface, a discharge end, a coupling end, and an internal passageway running through said discharge end and said coupling end;
  c) said valve body further comprising a tool grip comprising a plurality of gripping means;
  d) said plurality of gripping means each comprising a trough in said outside surface said trough comprising a first open end and a second open end and oriented such that said trough is perpendicular to said internal passageway.

6. A nipple valve as claimed in claim 5 wherein said coupling end further comprises a means to sealingly connect said coupling end to a water supply.

7. A nipple valve as claimed in claim 6 wherein said means to sealingly connect said coupling end to said water supply comprises a plurality of threads.

8. A nipple valve as claimed in claim 5 wherein each of said troughs further comprises rounded sloping sides and forms an edge which is in the shape of a circumference on said outside generally cylindrical surface.

9. A nipple valve as claimed in claim 5 having at least four gripping means, each arranged equidistant from the others around said outside generally cylindrical surface of said valve body.

10. A nipple valve used in an animal waterer comprising:
  a) a valve body of generally cylindrical shape with a discharge end, a coupling end, an axis running between said discharge end and said coupling end, and an outside surface;
  b) a tool grip comprising at least two gripping means on said outside surface of said valve body;
  c) said two gripping means each comprising a trough with a first open end, a second open end, and rounded, sloping sides.

11. A nipple valve as claimed in claim 10 wherein said valve body further comprises an internal passageway through said discharge end and said coupling end, and said discharge end is cut-away at a slant exposing said passageway and a valve member.

12. A nipple valve as claimed in claim 10 wherein each of said troughs is oriented perpendicular to said axis.

13. A nipple valve as claimed in claim 12 wherein there are four gripping means at equal distances around said generally cylindrical shaped valve body.

14. A nipple valve as claimed in claim 10 wherein said coupling end further comprises means to sealingly connect said coupling end to a water supply.

15. A nipple valve as claimed in claim 14 wherein said means to sealingly connect said coupling end to said water supply comprises a plurality of threads.

* * * * *